US012801428B2

(12) United States Patent
Jasleen et al.

(10) Patent No.: US 12,801,428 B2
(45) Date of Patent: Nov. 17, 2026

(54) APPLICATION PERFORMANCE ENHANCEMENT SYSTEM AND METHOD BASED ON A USER'S MODE OF OPERATION

(71) Applicant: Dell Products, L.P., Round Rock, TX (US)

(72) Inventors: Fnu Jasleen, Austin, TX (US); Harpreet Narula, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 815 days.

(21) Appl. No.: 17/804,890

(22) Filed: Jun. 1, 2022

(65) Prior Publication Data

US 2023/0393891 A1 Dec. 7, 2023

(51) Int. Cl.

*G06F 9/48* (2006.01)
*G06F 9/54* (2006.01)
*G06N 20/00* (2019.01)

(52) U.S. Cl.

CPC .............. *G06F 9/4881* (2013.01); *G06F 9/54* (2013.01); *G06N 20/00* (2019.01)

(58) Field of Classification Search

None

See application file for complete search history.

(56) References Cited

U.S. PATENT DOCUMENTS 10,157,351 B1* 12/2018 Rastogi ................. G06F 16/957
2015/0128156 A1* 5/2015 Zhu .......................... G06N 7/01
719/328
2015/0186535 A1* 7/2015 Patil ...................... G06F 3/0482
707/710
2019/0132219 A1* 5/2019 Gandhi ............... H04L 43/0811
2023/0164029 A1* 5/2023 Mermoud ............. H04L 41/145
709/220
2023/0216745 A1* 7/2023 Chen ................... H04L 41/0823
370/252
2023/0388592 A1* 11/2023 Lee .................... H04N 21/4852

OTHER PUBLICATIONS

A. Basu, R. Xu, M. S. Rahman and S. Kiyomto, "User-in-a-context: A blueprint for context-aware identification," 2016 14th Annual Conference on Privacy, Security and Trust (PST), Auckland, New Zealand, 2016, pp. 329-334 (Year: 2016).*

A. Madureira et al., "Using personas for supporting user modeling on scheduling systems," 2014 14th International Conference on Hybrid Intelligent Systems, Kuwait, Kuwait, 2014, pp. 279-284 (Year: 2014).*

* cited by examiner

*Primary Examiner* — Frank D Mills

(74) *Attorney, Agent, or Firm* — Fogarty LLP

(57) ABSTRACT

A system and method for Embodiments of systems and methods for managing performance optimization of applications executed by an Information Handling System (IHS) are described. In an illustrative, non-limiting embodiment, an IHS may include computer-executable instructions to identify a current persona of a user of the IHS, identify an application that is associated with the current persona, and prioritize the application associated with the current persona. The current persona being one of multiple modes of operating the IHS by the user.

10 Claims, 6 Drawing Sheets

APPLICATION PERFORMANCE ENHANCEMENT SYSTEM AND METHOD BASED ON A USER'S MODE OF OPERATION

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs can execute many different types of applications. In some IHSs, a machine learning (ML) engine (e.g., optimization engine) may be used to improve application performance by dynamically adjusting IHS settings. Particularly, a ML engine may apply a profile to adjust the operation of certain resources of the IHS, such as the operating system (OS), hardware resources (e.g., central processing units (CPUs), graphics processing units (GPUs), storage, etc.), or drivers used to interface with those hardware resources, or other applications that may be executed by the IHS.

These applications often communicate through networks to perform processing tasks. Generally, client IHSs establish communications via a network to a server IHS to retrieve and store information. For example, a client IHS may communicate with a network through a variety of wireless communication protocols, such as a wireless local area network (WLAN), a wireless wide area network (WWAN), or broadband cellular networks (5G). In an enterprise or residential network, client IHSs access networks through access points, such as with wireless or Ethernet interfaces (e.g., an Internet router interface). Modern WLAN protocols include the use of multiple bands. Generally speaking, a band refers to a small contiguous section of the radio-frequency (RF) spectrum that provides a channel for communication. Newer WLAN protocols are now provided with multi-band simultaneous (e.g., dual band simultaneous (DBS), tri band simultaneous (TBS), etc.) operation in which traffic can be simultaneously communicated over multiple channels.

SUMMARY

A system and method for managing performance optimization of applications executed by an Information Handling System (IHS) are described. In an illustrative, non-limiting embodiment, an IHS may include computer-executable instructions to identify a current persona of a user of the IHS, identify an application that is associated with the current persona, and prioritize the application associated with the current persona. The current persona being one of multiple modes of operating the IHS by the user.

According to another embodiment, an application performance enhancement method includes the steps of identifying a current persona of a user of the IHS, identifying an application that is associated with the current persona, and prioritizing the application. The current persona including one of multiple modes of operating the IHS by the user;

According to yet another embodiment, a memory storage device having program instructions stored thereon that, upon execution by one or more processors of an Information Handling System (IHS), cause the IHS to identify a current persona of a user of the IHS, the current persona comprising one of a plurality of modes of operating the IHS by the user, identify an application that is associated with the current persona, and prioritize the application.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
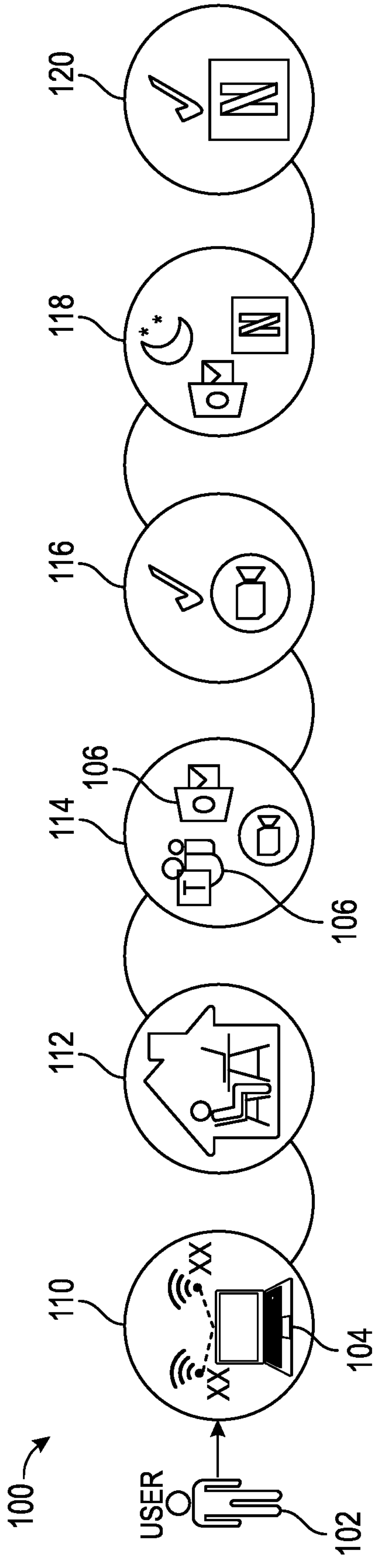
FIG. 1 illustrates an example scenario showing how the application performance enhancement system and method may be used to enhance the performance of applications based on a user's changing persona according to one embodiment of the present disclosure.

Embodiments of the present disclosure provide an application performance enhancement system and method that optimizes applications based on a current persona (e.g., mode of operation) of a user of an Information Handling System (IHS). Whereas conventional application optimization implementations have typically employed the use of hard-coded whitelists of applications that are to be optimized, they have not addressed the salient issues of a user's persona that can and most likely will change over time at recurring intervals. Embodiments of the present disclosure provide a solution to this problem, among other problems, by providing an application performance enhancement system and method that identifies the various personas of the user of an IHS, identifies productivity (e.g., important) applications that may be important to the user during those intervals, and optimizes those productivity applications. One key aspect of certain embodiments may involve contextual mapping of applications to available wireless links with a Machine Learning (ML) (e.g., inference) engine to optimize platform, workload, and environment to deliver an optimal wireless connectivity experience. In some respects, the wireless connectivity enhancements may be provided as a connectivity-as-a-Service offering for users.

Conventional wireless networks have provided the ability to connect to multiple links (e.g., channels, bands, etc.) simultaneously. For example, WLAN protocols are now provided with multi-band simultaneous (e.g., dual band simultaneous (DBS), tri band simultaneous (TBS), etc.) operation in which traffic can be simultaneously communicated over multiple channels or bands. A band generally refers to a small contiguous section of the radio-frequency (RF) spectrum that provides a channel for communication. In the particular case of one used by the multi-band simultaneous device, a band may be those used by a Wi-Fi protocol based on the IEEE 802.11 family of standards, such as a 2.4 GHz band, a 5 GHz band, and/or a 60 GHz band. Additionally new protocols have provided for simultaneous operation with cellular bands (e.g., 5G).

Application network usage may be divided among these multiple links so that they can get the bandwidth they require, while not encountering undue deterioration due to starved bandwidth. Yet problems still arise with regard to how to prioritize the applications to ensure that the target application for a user gets an optimal bandwidth. Current implementations have involved white-listing of certain applications based on a user's persona. White-listing generally refers to the act of hard-coding a list of certain applications that are believed to be relatively more important than other applications. That is, a white-list may contain a list of applications that will be prioritized for a user.

This approach, however, does not address the fact that an application's use often changes over time such that the static white-list becomes obsolete. Additionally, the assumption that all users within a persona may use the same target applications is not accurate. For example, users within the same persona may use different video apps of the same type (e.g., ZOOM, TEAMS, etc.), and even the type can change over time. Within this disclosure, a persona generally refers to any of multiple modes of operation that that the user may encounter at recurring intervals. For example, a user might have multiple personas during a typical day. For example, one persona of a user may involve using a work laptop computer to watch a NETFLIX video in the evening, while another persona may involve using the work laptop computer to create a POWERPOINT presentation during work hours. These different personas may provide a relatively more in-depth understanding of the user and the target applications that are important to the user so that those application can be optimized in a dynamic and intelligent manner to improve customer experience.

FIG. 1 illustrates an example scenario 100 showing how the application performance enhancement system and method may be used to enhance the performance of applications based on a user's changing persona according to one embodiment of the present disclosure. The scenario 100 commences with a user 102 working at a laptop computer 104 that has a 2.4 Gigahertz (GHz) connection and a 5.0 GHz connection at phase 110. It is currently in the afternoon during work hours. As shown at phase 112, the system determines that the user 102 is working from home, and at phase 114, it identifies certain applications 106 (e.g., ZOOM, TEAMS, OUTLOOK) that he is currently using. The system then determines that one particular application (e.g., ZOOM) is a productivity application at phase 116, and thus optimizes the laptop computer 104 to run that application. In one embodiment, the system detects that the 5.0 GHz connection is currently providing the best performance so the system causes the productivity application to use the 5.0 GHz connection.

At a later point in time in the evening, the user 102 begins using a video streaming application (e.g., NETFLIX) at phase 118. The system uses various different factors known about the user (e.g., daily habits, location, time of day, etc.) to know that the user's persona has changed. Based on inferences generated about the user 102, the system then optimizes the laptop computer 104 for running the video streaming application at phase 120. For example, the application performance enhancement system and method may cause the video streaming application to use the 5.0 GHz connection due to its superior performance. Thus as can be seen, the application performance enhancement system and method optimizes the laptop computer for running certain applications based upon inferences of the user's persona as will be described in detail herein below.

Figure 2:
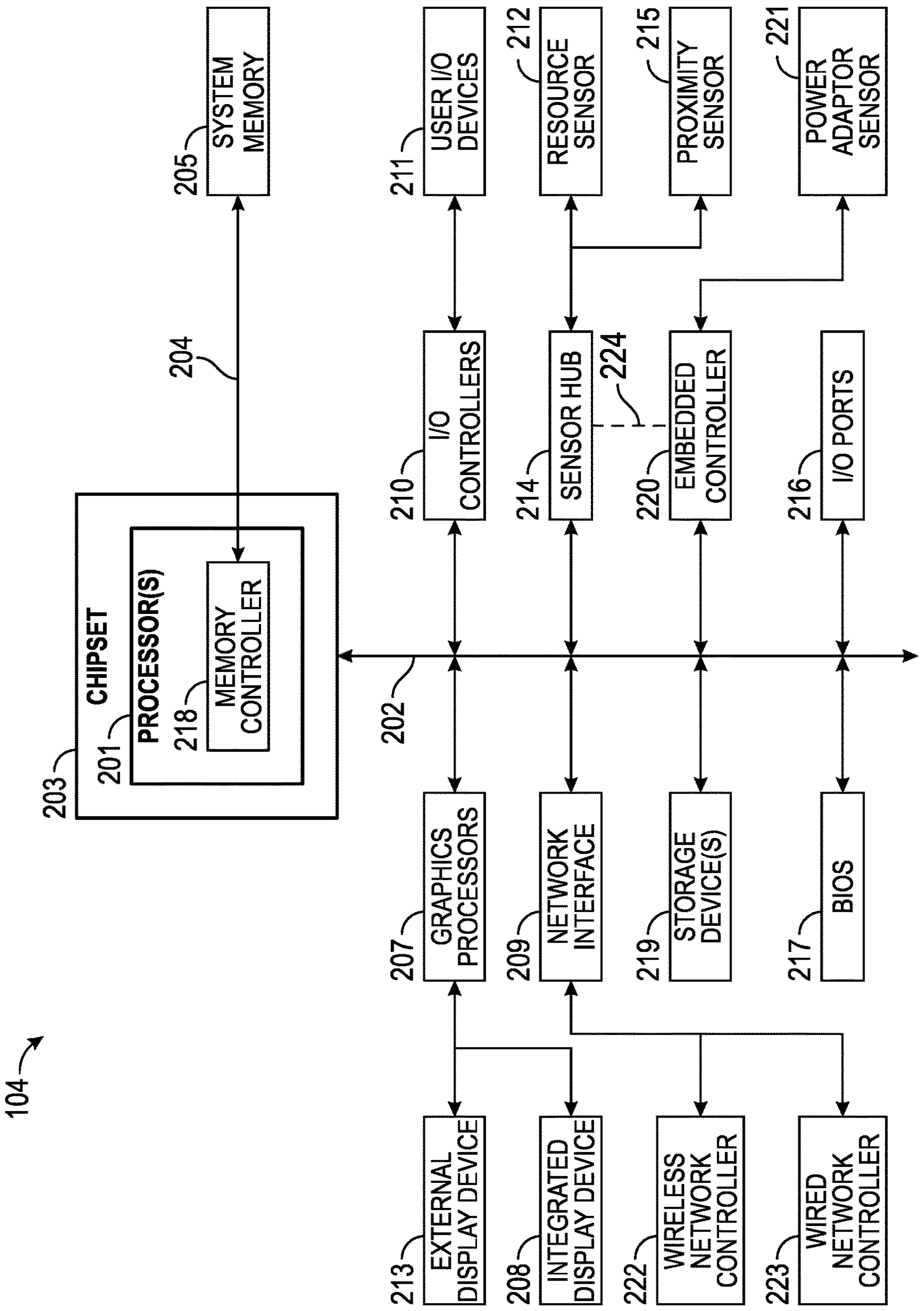
FIG. 2 is a block diagram illustrating components of an example IHS that may be configured to manage performance optimization of applications according to one embodiment of the present disclosure.

FIG. 2 is a block diagram illustrating components of an example IHS 104 that may be configured to manage performance optimization of applications according to one embodiment of the present disclosure. IHS 104 may be incorporated in whole, or part, as IHS 104 of FIG. 1. As shown, IHS 104 includes one or more processors 201, such as a Central Processing Unit (CPU), that execute code retrieved from system memory 205. Although IHS 104 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, processor 201 includes an integrated memory controller 218 that may be implemented directly within the circuitry of processor 201, or memory controller 218 may be a separate integrated circuit that is located on the same die as processor 201. Memory controller 218 may be configured to manage the transfer of data to and from the system memory 205 of IHS 104 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 104 utilizes chipset 203 that may include one or more integrated circuits that are connected to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides processor(s) 201 with access to a variety of resources accessible via bus 202. In IHS 104, bus 202 is illustrated as a single element. Various embodiments may utilize any number of separate buses to provide the illustrated pathways served by bus 202.

In various embodiments, IHS 104 may include one or more I/O ports 216 that may support removable couplings with various types of external devices and systems, including removable couplings with peripheral devices that may be configured for operation by a particular user of IHS 104. For instance, I/O 216 ports may include USB (Universal Serial Bus) ports, by which a variety of external devices may be coupled to IHS 104. In addition to or instead of USB ports, I/O ports 216 may include various types of physical I/O ports that are accessible to a user via the enclosure of the IHS 104.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 104 via network interface 209. In various implementations, I/O controller 210 may support the operation of one or more user I/O devices 211 such as a keyboard, mouse, touchpad, touchscreen, microphone, speakers, camera and other input and output devices that may be coupled to IHS 104. User I/O devices 211 may interface with an I/O controller 210 through wired or wireless couplings supported by IHS 104. In some cases, I/O controllers 210 may support configurable operation of supported peripheral devices, such as user I/O devices 211.

As illustrated, a variety of additional resources may be coupled to the processor(s) 201 of the IHS 104 through the chipset 203. For instance, chipset 203 may be coupled to network interface 209 that may support different types of network connectivity. IHS 104 may also include one or more Network Interface Controllers (NICs) 222 and 223, each of which may implement the hardware required for communicating via a specific networking technology, such as Wi-Fi, BLUETOOTH, Ethernet and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support different types of network connectivity, such as the network connectivity utilized by IHS 104.

Chipset 203 may also provide access to one or more display device(s) 208 and 213 via graphics processor 207. Graphics processor 207 may be included within a video card, graphics card or within an embedded controller installed within IHS 104. Additionally, or alternatively, graphics processor 207 may be integrated within processor 201, such as a component of a system-on-chip (SoC). Graphics processor 207 may generate display information and provide the generated information to one or more display device(s) 208 and 213, coupled to IHS 104.

One or more display devices 208 and 213 coupled to IHS 104 may utilize LCD, LED, OLED, or other display technologies. Each display device 208 and 213 may be capable of receiving touch inputs such as via a touch controller that may be an embedded component of the display device 208 and 213 or graphics processor 207, or it may be a separate component of IHS 104 accessed via bus 202. In some cases, power to graphics processor 207, integrated display device 208 and/or external display device 213 may be turned off, or configured to operate at minimal power levels, in response to IHS 104 entering a low-power state (e.g., standby).

As illustrated, IHS 104 may support an integrated display device 208, such as a display integrated into a laptop, tablet, 2-in-1 convertible device, or mobile device. IHS 104 may also support use of one or more external display devices 213, such as external monitors that may be coupled to IHS 104 via various types of couplings, such as by connecting a cable from the external display devices 213 to external I/O port 216 of the IHS 104. In certain scenarios, the operation of integrated displays 208 and external displays 213 may be configured for a particular user. For instance, a particular user may prefer specific brightness settings that may vary the display brightness based on time of day and ambient lighting conditions.

Chipset 203 also provides processor 201 with access to one or more storage devices 219. In various embodiments, storage device 219 may be integral to IHS 104 or may be external to IHS 104. In certain embodiments, storage device 219 may be accessed via a storage controller that may be an integrated component of the storage device. Storage device 219 may be implemented using any memory technology allowing IHS 104 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 104 also includes Basic Input/Output System (BIOS) 217 that may be stored in a non-volatile memory accessible by chipset 203 via bus 202. Upon powering or restarting IHS 104, processor(s) 201 may utilize BIOS 217 instructions to initialize and test hardware components coupled to the IHS 104. BIOS 217 instructions may also load an operating system (OS) (e.g., WINDOWS, MACOS, iOS, ANDROID, LINUX, etc.) for use by IHS 104.

BIOS 217 provides an abstraction layer that allows the operating system to interface with the hardware components of the IHS 104. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 104 embodiments may utilize sensor hub 214 capable of sampling and/or collecting data from a variety of sensors. For instance, sensor hub 214 may utilize hardware resource sensor(s) 212, which may include electrical current or voltage sensors, and that are capable of determining the power consumption of various components of IHS 104 (e.g., CPU 201, GPU 207, system memory 205, etc.). In certain embodiments, sensor hub 214 may also include capabilities for determining a location and movement of IHS 104 based on triangulation of network signal information and/or based on information accessible via the OS or a location subsystem, such as a GPS module.

In some embodiments, sensor hub 214 may support proximity sensor(s) 215, including optical, infrared, and/or sonar sensors, which may be configured to provide an indication of a user's presence near IHS 104, absence from IHS 104, and/or distance from IHS 104 (e.g., near-field, mid-field, or far-field).

In certain embodiments, sensor hub 214 may be an independent microcontroller or other logic unit that is coupled to the motherboard of IHS 104. Sensor hub 214 may be a component of an integrated system-on-chip incorporated into processor 201, and it may communicate with chipset 203 via a bus connection such as an Inter-Integrated Circuit ($I^2C$) bus or other suitable type of bus connection. Sensor hub 214 may also utilize an $I^2C$ bus for communicating with various sensors supported by IHS 104.

As illustrated, IHS 104 may utilize embedded controller (EC) 220, which may be a motherboard component of IHS 104 and may include one or more logic units. In certain embodiments, EC 220 may operate from a separate power plane from the main processors 201 and thus the OS operations of IHS 104. Firmware instructions utilized by EC 220 may be used to operate a secure execution system that may include operations for providing various core functions of IHS 104, such as power management, management of operating modes in which IHS 104 may be physically configured and support for certain integrated I/O functions.

EC 220 may also implement operations for interfacing with power adapter sensor 221 in managing power for IHS 104. These operations may be utilized to determine the power status of IHS 104, such as whether IHS 104 is operating from battery power or is plugged into an AC power source (e.g., whether the IHS is operating in AC-only mode, DC-only mode, or AC+DC mode). In some embodiments, EC 220 and sensor hub 214 may communicate via an out-of-band signaling pathway or bus 224.

In various embodiments, IHS 104 may not include each of the components shown in FIG. 2. Additionally, or alternatively, IHS 104 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as an SoC.

Figure 3:
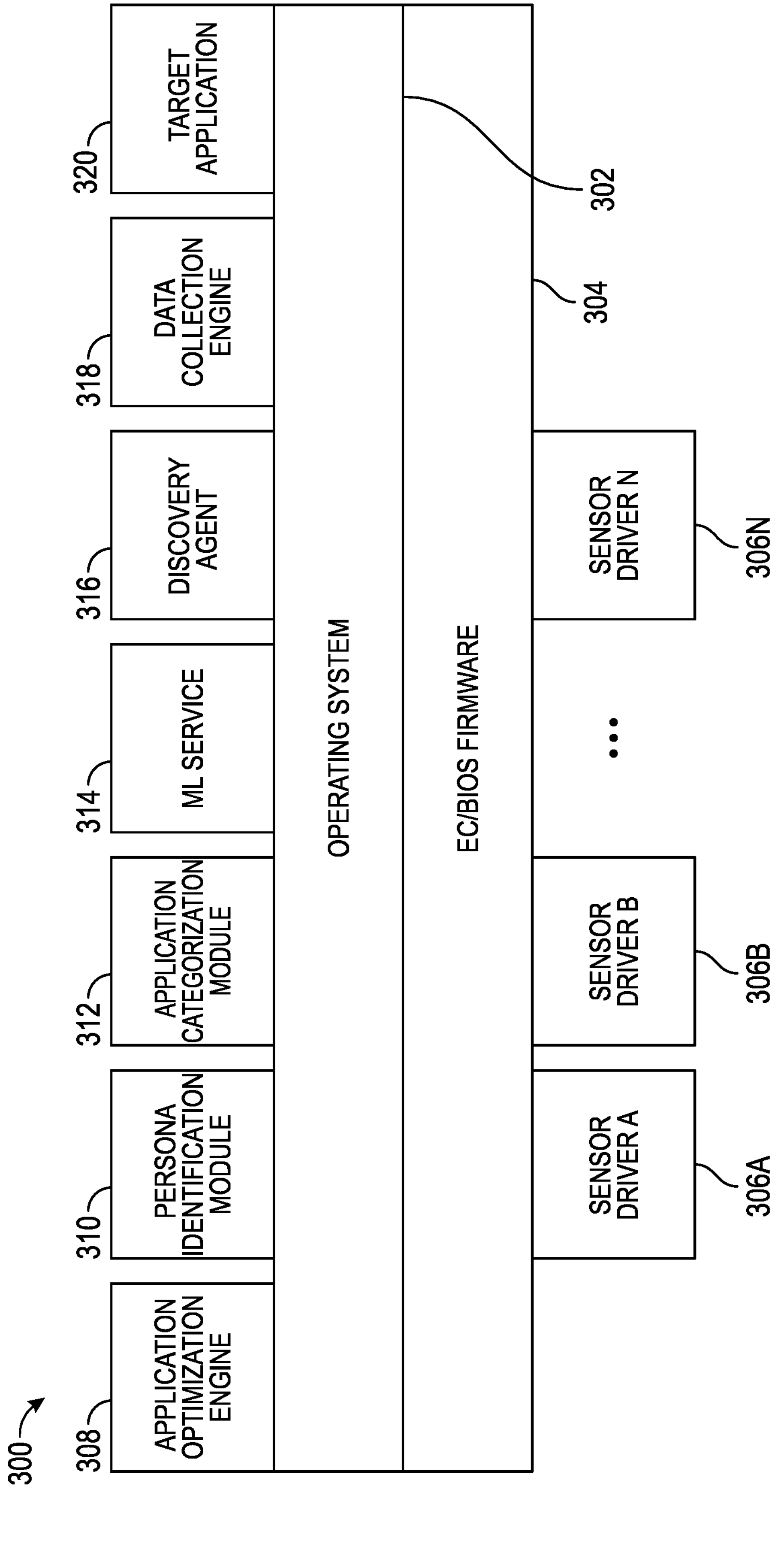
FIG. 3 is a block diagram illustrating an example of a software system produced by an IHS for managing the performance optimization of a target application.

FIG. 3 is a block diagram illustrating an example of a software system 300 produced by IHS 104 for managing the performance optimization of a target application 320. In some embodiments, each element of software system 300 may be provided by IHS 104 through the execution of program instructions by one or more logic components (e.g., CPU 201, BIOS 217, EC 220, etc.) stored in memory (e.g., system memory 205), storage device(s) 219, and/or firmware. As shown, software system 300 includes an application optimization engine 308, a persona identification module 310, an application categorization module 312, a discovery agent 316, a data collection engine 318, and a target application 320. Although only one target application 320 is shown herein, it should be understood that application optimization engine 308 may be configured to optimize the performance of any type and number of target applications that may be executed on IHS 104.

Examples of a suitable target application 320 whose performance may be optimized include resource-intensive applications, such as MICROSOFT POWERPOINT, MICROSOFT EXCEL, MICROSOFT WORD, ADOBE ILLUSTRATOR, ADOBE AFTER EFFECTS, ADOBE MEDIA ENCODER, ADOBE PHOTOSHOP, ADOBE PREMIER, AUTODESK AUTOCAD, AVID MEDIA COMPOSER, ANSYS FLUENT, ANSYS WORKBENCH, SONAR CAKEWALK, and the like; as well as less resource-intensive applications, such as media players, web browsers, document processors, email clients, etc.

The application optimization engine 308, persona identification module 310, application categorization module 312, ML service 314, and target application 320 are executed by an OS 302, which is turn supported by EC/BIOS instructions/firmware 304. EC/BIOS firmware 304 is in communications with, and configured to receive data collected by, one or more sensor modules or drivers $306_A$-$306_N$, which may abstract and/or interface with hardware resource sensor 212, proximity sensor 215, and power adapter sensor 221, for example.

The application optimization engine 308 uses the ML service 314 to optimize certain applications 320 based on their relevance to the current persona of the user. For each user persona, the application optimization engine 308 identifies the category of applications that are most productive or most relevant. For example, for a software developer, software development applications may exhibit a relatively higher relevance than other applications. For a gamer, however, simulation applications may be more relevant. Data collected for a wireless traffic user persona classification provides the application optimization engine 308 with a list of applications that are used in each wireless traffic persona. The goal is to identify which applications that users in that wireless traffic persona care about that use bandwidth. For example, a software developer might be running an audio streaming service (e.g., SPOTIFY) all day in the background (e.g., low relevance), while being deeply concerned about software development applications that are currently running (e.g., high relevance).

The application optimization engine 308 individually studies each persona to understand user interaction with various categories of applications to identify a productivity application class. The application optimization engine 308 may use supervised Machine Learning (ML) of the ML service 314 to identify the class of most productive applications for each user persona. Once the application optimization engine 308 has identified productive applications for each persona, it may then identify a dynamic persona of the user and prioritize productivity applications for that persona. A user might belong to multiple personas depending on the location and time of the day. For example, the user might be a developer during the daytime and gamer during evening hours.

The application categorization module 312 categorizes applications into groups to identify requirements as an application group rather than individual applications. For example, the application categorization module 312 may automatically add a new application to an existing group to be able to identify its task, functionality, and utilization. Such categorization allows software applications to be understood in terms of those categories, rather than the particularities of each package. Examples of application categories may include database, multimedia, enterprise, educational, simulation, and the like.

The persona identification module 310 identifies multiple personas for users. The grouping of users into personas based on the goal that they are trying to achieve with their devices may be useful for determining relevant application whose performance may be optimized. The persona identification module 310 may perform persona classification to understand what the user wants; that is, it provides a context of the user. The classification and identification of user personas will be performed by considering multiple factors, such as the time of day (e.g., morning, noon, afternoon, evening, nighttime, etc.), location, age, and gender. The persona identification module 310 may use a ML process so that the personas generated may be dynamically adapted to the ever changing goals of the user. This behavior is substantially different from conventional techniques where personas identified for users are static and thus, cannot adapt to changes in the user's goals and lifestyles.

Discovery agent 316 is provided to discover the resources (e.g., CPU, GPU, memory, NICs, etc.) configured in the IHS 104, and report the results to application optimization engine 308. For example, discovery agent 316 may respond to a request from application optimization engine 308 to acquire information regarding most or all resources configured in IHS 104 to be used for optimizing the performance of the target application 320. In a particular example, discovery agent 316 may access a firmware portion of IHS 104 to obtain the resource data for those resources registered in its BIOS 217, and stored in a memory 205 of IHS 104. Within this disclosure, resource data generally refers to any information that may be used to access and/or manage its associated resource (e.g., acquire parametric data, change its configuration, etc.). For any non-registered (unsupported/unqualified) resource, however, its resource data may be unknown. That is, no data or insufficient data for that resource may be available in BIOS 217. In such a case, application optimization engine 308 may issue or broadcast inquiry messages to those resources in IHS 104, and process response messages to identify those non-registered resources in IHS 104, and report the results back to application optimization engine 308.

According to one embodiment of the present disclosure, the discovery agent 316 may discover any APIs associated with the resources in the IHS 104 and report the results to the application categorization module 312. Automatic categorization of applications may be useful because with the number of applications being used today, it may be difficult to manually categorize all of them. Moreover, manual categorization of applications can be tedious, expensive, and laborious. The application categorization module 312 may access the discovery agent 316 to use Application Programming Interface (API) calls from third-party libraries for automatic categorization of software applications that use these API calls.

This approach is general since it enables different categorization algorithms to be applied to repositories that contain both source code and bytecode of applications, since API calls can be extracted from both the source code and byte-code. The intent is to use external API calls from third-party libraries and packages that are invoked by software applications (e.g., the Java Development Kit (JDK)) as a set of attributes for categorization. Using API calls as attributes is based on the fact that software is often developed using API calls from well-defined and widely used libraries. APIs are already grouped in packages and libraries based on their functionalities by the software programmers who built those APIs. The fact that the APIs are grouped makes APIs ideal for use in machine learning approaches to categorize applications.

For example, a music player application is more likely than a text editor to use a sound output library so that finding APIs from this library in the music player application enables the system to properly categorize it. Moreover, APIs are common to many software programs and invocations of the API calls can be extracted from the executable form of applications because the API calls exist in external packages and libraries. In addition, using API calls results in fewer attributes when compared to other approaches that may use all words from the source code to categorize applications, thus potentially improving the performance of categorization approaches.

The data collection engine 318 may include any data collection service or process, such as, for example, the DELL DATA VAULT configured as a part of the DELL SUPPORT CENTER that collects information on system health, performance, and environment. In some cases, data collection engine 318 may receive and maintain a database or table that includes information related to IHS hardware utilization (e.g., by application, by thread, by hardware resource, etc.), power source (e.g., AC-plus-DC, AC-only, or DC-only), and the like.

The ML service 314 provides optimization services for the application optimization engine 308, persona identification module 310, and application categorization module 312. In one embodiment, application optimization engine 308 may include features, or form a part of, the DELL PRECISION OPTIMIZER. In general, the application optimization engine 308 uses the ML service 314 to provide for system wide optimization of the target application 320 by obtaining data from the various resources that form the IHS 104, and analyzing the obtained data to generate ML-based hints based upon the overall coordinated operation of some, most, or all resources that are used to execute the target application 320. In one embodiment, the application optimization engine 308 may include a policy management function that optimizes the operation of the target application 320 according to one or more policies. For example, the policy management function may limit hints that would be otherwise applied to certain resources based upon those hints causing undue loading upon certain other resources in the IHS 104. Furthering this example, while the application optimization engine 308 would otherwise infer that an increase of memory caching provided by system memory 205 may be beneficial to the operation of the target application 320, its knowledge about other applications running on IHS 104 as well as the current state of other resources in the IHS 104 may indicate that such inference should be reduced (e.g., throttled) so as to not unduly overburden those other resources. Additionally, the application optimization engine 308 may use the policy management function to infer hints for other resources in IHS 104 so that most or all of the resources in IHS 104 may be collectively optimized for operation of the target application 320.

The application optimization engine 308 uses the ML service 314 to monitor each resource of the IHS 104 along with telemetry data obtained directly from resources, and sensors 306 to characterize its resource utilization. For example, the ML service 314 may obtain data from the resources of the IHS 104 in addition to telemetry data from data collection engine 318, and/or directly from sensors $306_1$-$306_N$ configured in IHS 104 to generate one or more ML-based hints associated with the target application 320. Once the ML service 314 has collected characteristics over a period of time, it may then process the collected data using statistical descriptors to extract the application performance features of the target application 320. For example, the ML service 314 may monitor the target application 320 over time to estimate its resource usage with respect to various aspects, such as which actions performed by the target application 320 cause certain resources to encounter loading, events occurring on the IHS 104 that causes the target application 320 to require a relatively high level of resource usage, and a time period of day in which these actions are encountered. Once the ML service 314 has collected characteristics over a period of time, it may then process the collected data using statistical descriptors to extract the application performance features associated with the target application 320. The ML service 314 may use a machine learning algorithm such as, for example, a Bayesian algorithm, a Linear Regression algorithm, a Decision Tree algorithm, a Random Forest algorithm, a Neural Network algorithm, or the like.

As shown, the ML service 314 is stored and executed on the IHS 104 it is configured to provide optimization services for. In other embodiments, the application optimization engine 308 may be a cloud provided service in which it communicates through a publicly available communication network, such as the Internet, to communicate with the IHS 104 for optimizing one or more target applications 320. For example, the ML service 314 may be provided as a subscription service, in which users of IHS 104 may register for providing ML optimization such as described herein.

Figure 4:
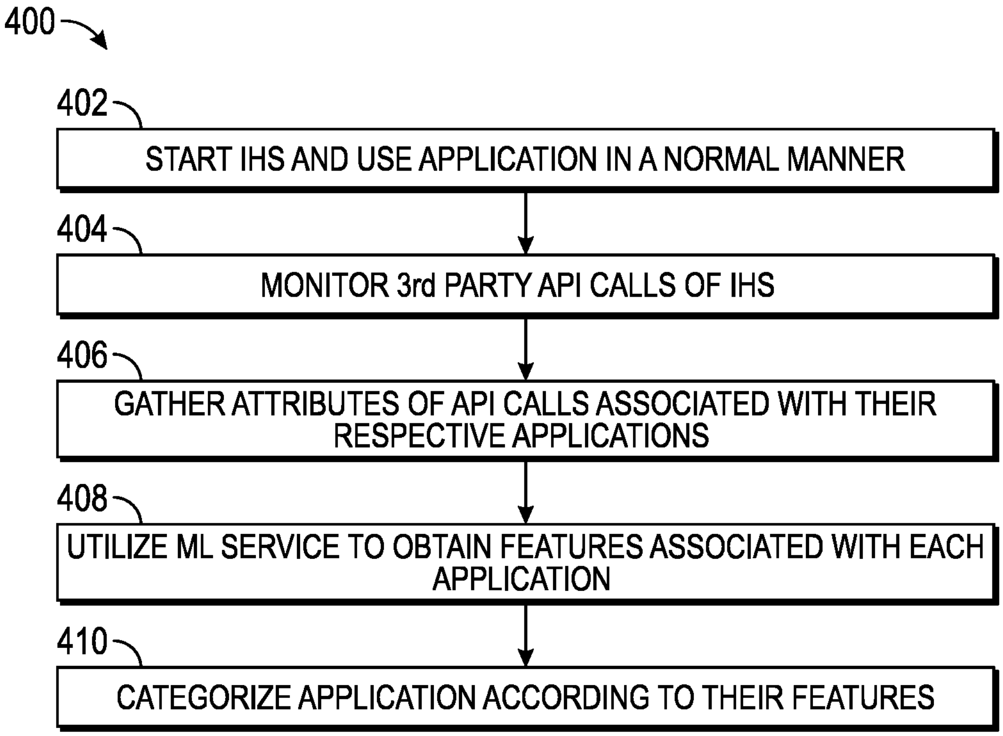
FIG. 4 illustrates an example application categorization method that may be performed to categorize application in one or more groups according to one embodiment of the present disclosure.

FIG. 4 illustrates an example application categorization method 400 that may be performed to categorize application in one or more groups according to one embodiment of the present disclosure. Additionally or alternatively, the application categorization method 400 may be performed by the application categorization module 312, ML service 314, and/or data collection engine 318 described herein above. The application categorization module 312, ML service 314, and/or data collection engine 318 may be executed in the background to continually obtain information about applications running on the IHS 104. In other embodiments, the application categorization module 312, ML service 314, and/or data collection engine 318 may be started and stopped manually, such as in response to user input. In yet another embodiment, if the system is configured as a cloud service, the application categorization module 312, ML service 314, and/or data collection engine 318 may be started by receiving a request message from IHS 104 to the application categorization module 312, ML service 314, and/or data collection engine 318, and sending a response message to IHS 104 for initiating a communication channel between IHS 104 and application categorization module 312, ML service 314, and/or data collection engine 318 for enabling control over the resources of IHS 104.

At step 402, the IHS 104 is started and applications are used by the user in a normal manner. At step 404, the method 400 monitors third party API calls used by the applications. When an API call is detected at step 406, it may gather attributes of API calls associated with their respective applications. For example, when the API call is detected, the method 400 may log information about the API call, such as a date/time when the API call was made, the type of activity requested by the application, and the result of the requested activity. The method 400 may continue monitoring and gathering data associated with API calls over a period of time to obtain a sufficient distribution of data that can be analyzed by the ML service 314. Nevertheless, when a sufficient amount of data is obtained, the method 400 may utilize the ML service 314 to obtain features associated with each application at step 408. For example, if an application continually requests access to the APIs of a GPU and an audio card configured in the IHS 104, the ML service 314 may determine that the application is a video streaming or conferencing application. On the other hand, if another application is detected to be periodically accessing and updating memory in a certain manner with little or no access to the GPU and/or audio card, the ML service 314 may determine that the application is a word processing application. Thus at step 410, the method 400 categorizes each of the applications according to their features. Example categories may include a database, multimedia, enterprise, educational, and/or simulation category.

Figure 5:
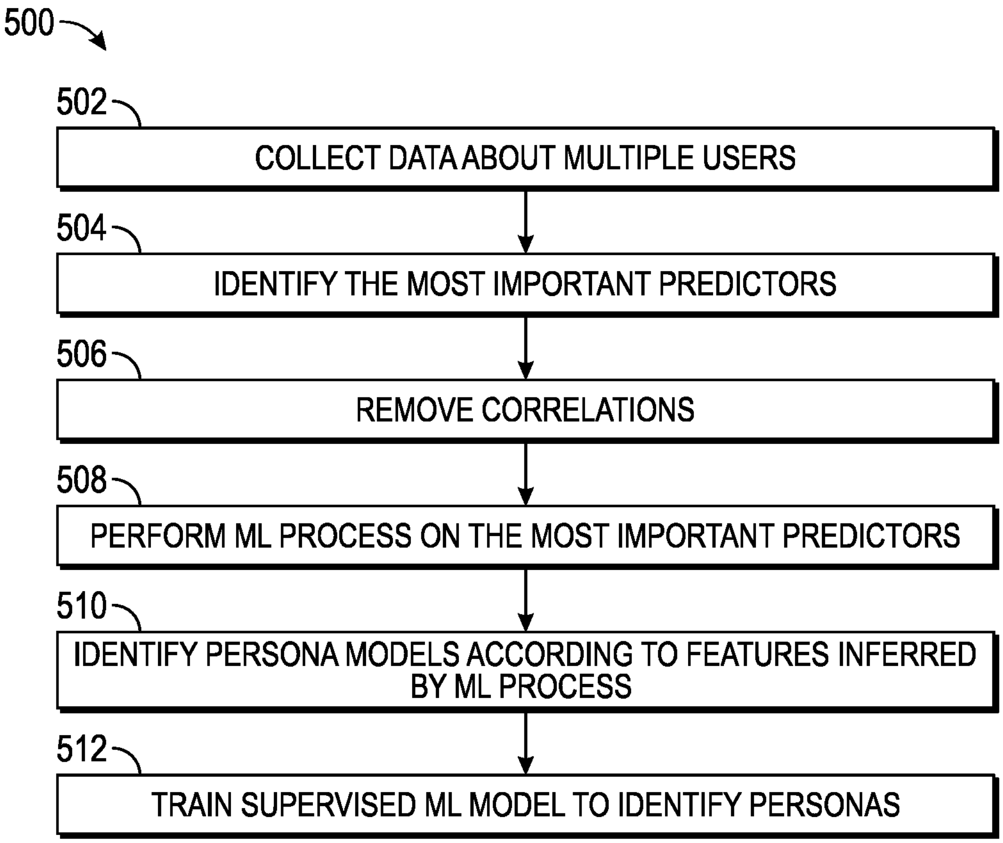
FIG. 5 illustrates an example persona model generation method that may be performed to generate persona models from a group of users according to one embodiment of the present disclosure.

FIG. 5 illustrates an example persona model generation method 500 that may be performed to generate persona models from a group of users according to one embodiment of the present disclosure. Additionally or alternatively, the application categorization method 400 may be performed by a cloud-based environment, such as vendor support portal managed by a vendor of the IHS 104. For example, the IHSs 104 of a group of users may communicate with the cloud-based environment to collect data associated with how they each use certain applications over different times of the day and under different contexts (e.g., work, home, vacation, traveling, etc.) so that persona models associated with different types of users may be generated. In other embodiments, the persona model generation method 500 may be performed by certain components of the system, such as the persona identification module 310, ML service 314, and/or data collection engine 318.

Initially at step 502, the method 500 collects data about multiple users as they are using applications on their IHSs 104. The method 500 may utilize any quantity of users. In one embodiment, the system may use a sufficient number of users to form a normal distribution of data based on the different ways in which they use the applications. The data types may include, for example, age, IHS location (e.g., home, office, travel, etc.), gender, time of day, applications used, and the like. Thereafter at step 504, the method 500 identifies the most important predictors. For example, the method 500 may select the top 25 data types based upon the extent and ubiquity of data availability.

At step 506, the method 500 removes any correlations in the data. For example, the method 500 may remove redundant data present in the currently obtained data set. Thereafter at step 508, the method 500 performs a ML process on the most important predictors. In one embodiment, the method 500 uses an unsupervised ML process so that it may capture patterns as probability densities or provide a combination of neural feature preferences. That is, an unsupervised ML process may be used so that expert input does not unduly hide feature patterns that would otherwise provide good insight into norms used in running the applications. Any suitable ML process may be used. In one embodiment, a cloud-based ML process may be used. In other embodiments, the ML service 314 may be used, and the results of the ML service 314 transmitted to the cloud-based service for correlation with the results generated by the ML service 314 of other IHSs 104.

At step 510, the method 500 identifies persona models according to features inferred by ML process. In one embodiment, the method 500 may assign certain users having similar features into a group. For example, one group may be software developers while at work. Another example persona group may include a certain profession (e.g., architects, engineers, nurses, plumbers, etc.) during a certain time of day (e.g., working hours, evening hours, weekends, etc.). Thereafter at step 512, the method 500 trains a supervised ML model to identify personas. That is, the method 500 may apply the features of the persona models previously learned by the method 500 to a supervised ML process so that the persona of each user may be detected in the future.

Figure 6:
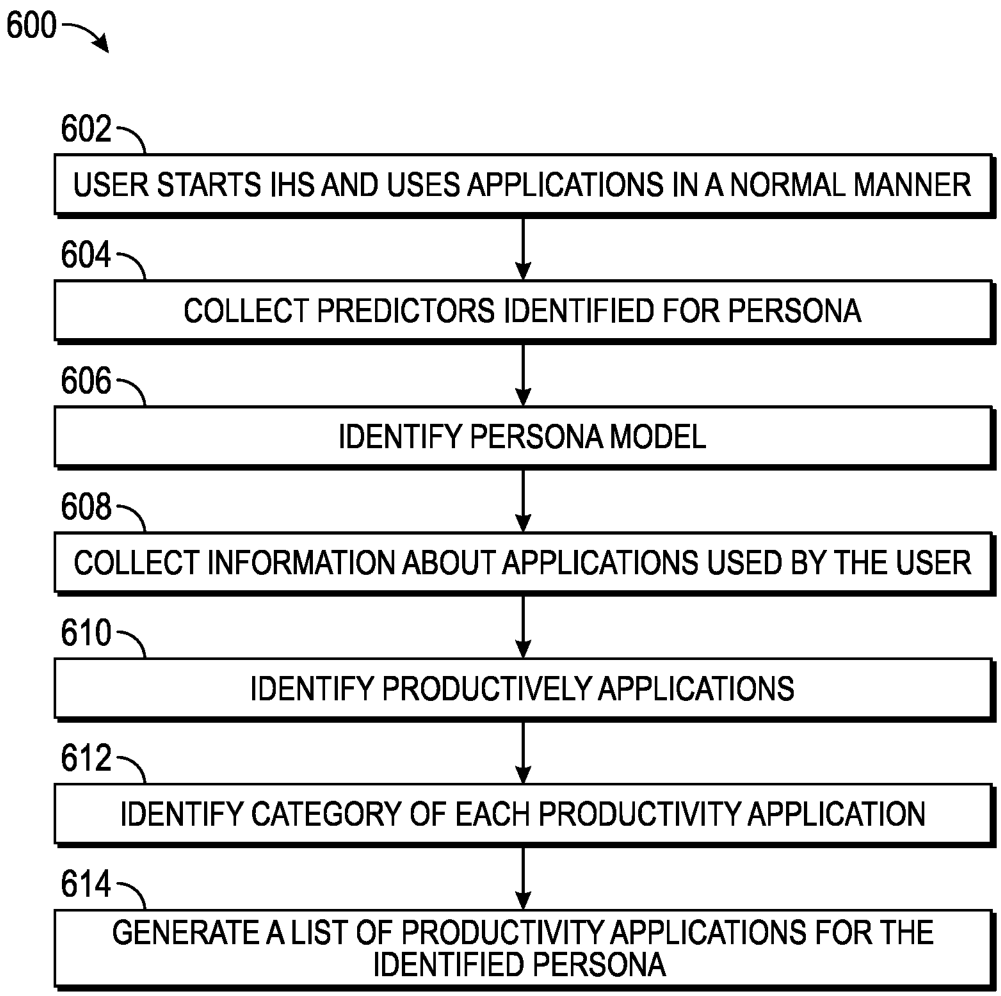
FIG. 6 illustrates an example persona determination method that may be performed to identify a persona that a user is currently using, and generate a list of productivity applications based on the identified persona according to one embodiment of the present disclosure.

FIG. 6 illustrates an example persona determination method 600 that may be performed to identify a persona that a user is currently using, and generate a list of productivity applications based on the identified persona according to one embodiment of the present disclosure. Initially, the application categorization method 400 and persona model generation method 500 may be performed to categorize the applications on the IHS 104, and generate a trained supervised personal identification model, respectively.

Additionally or alternatively, the persona determination method 600 may be performed by the persona identification module 310, ML service 314, and/or data collection engine 318 described herein above. The persona identification module 310, ML service 314, and/or data collection engine 318 may be executed in the background to continually obtain information about how the user 102 is operating the applications on the IHS 104. In other embodiments, the persona identification module 310, ML service 314, and/or data collection engine 318 may be started and stopped manually, such as in response to user input. In yet another embodiment, if the system is configured as a cloud service, the persona identification module 310, ML service 314, and/or data collection engine 318 may be started by receiving a request message from the IHS 104 to the persona identification module 310, ML service 314, and/or data collection engine 318, and sending a response message to IHS 104 for initiating a communication channel between IHS 104 and persona identification module 310, ML service 314, and/or data collection engine 318 for enabling control over the resources of IHS 104.

At step 602, the IHS 104 is started and applications are used by the user in a normal manner. At step 604, the method 600 collects predictors identified for each possible persona model. That is, the method 600 may continually monitor certain activities (e.g., memory write/read events, NIC card transmit/receive events, burstiness and/or amount of NIC card throughput, CPU and/or GPU access events, etc.) of the IHS 104 as determined by the predictors for each possible persona model generated at step 512 of method 500 described herein above. Using the identified predictors, the method 600 may then identify a particular persona model that the user 102 may be using at step 606.

At step 608, the method 600 collects information about the applications currently being used by the user. For example, the method 600 may access the Task Manager (Windows OS) or System Manager (Linux OS) to identify those applications that are currently running on the IHS 104. Given the application information obtained from the IHS 104, the method 600 may identify any productivity applications (e.g., target applications) running on the IHS 104 at step 610. Thereafter at step 612, the method 600 may then identify a category (e.g., database, multimedia, enterprise, educational, and/or simulation, etc.) of each identified productivity application. In one embodiment, the method 600 may identify a category of each productivity application according to the categorization of the applications performed at step 410 of method 400. Then at step 614, may generate a list of productivity applications for the identified persona. For example, the method may generate a lookup table that includes a field for each application that has been determined to be a productivity application. Thus, at this point, the application performance enhancement system has identified a current persona of the user of the IHS from among multiple, different personas, and identified one or more productivity applications based on the identified persona.

Figure 7:
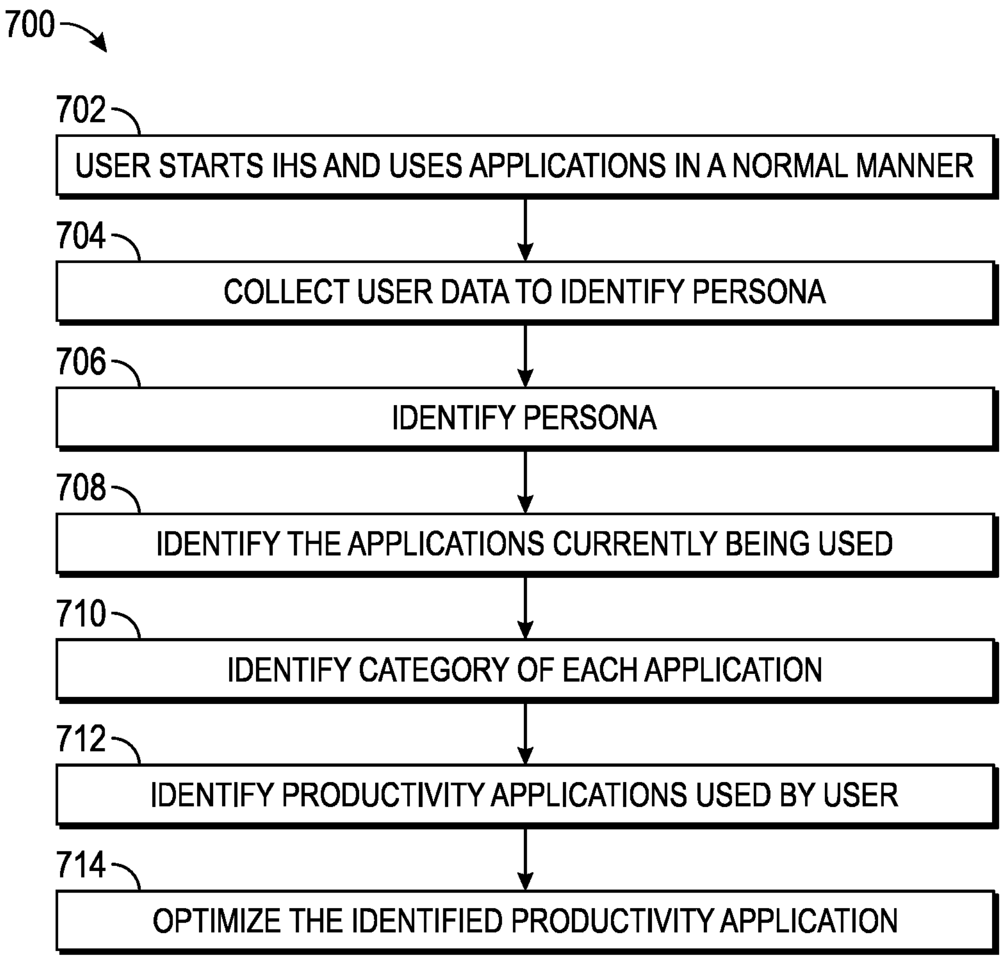
FIG. 7 illustrates an example application optimization method that may be performed to optimize one or more target applications according to one embodiment of the present disclosure.

FIG. 7 illustrates an example application optimization method 700 that may be performed to optimize one or more target applications according to one embodiment of the present disclosure. Initially, application categorization method 400, persona model generation method 500, and persona determination method 600 may be performed to categorize the applications on the IHS 104, generate a trained supervised personal identification model, and determine a current persona of the user 102, respectively.

Additionally or alternatively, the application optimization method 700 may be performed by the application optimization engine 308, ML service 314, and/or data collection engine 318 described herein above. The application optimization engine 308, ML service 314, and/or data collection engine 318 may be executed in the background to continually obtain information about applications running on the IHS 104 over an extended period of time to gather sufficient data so that the ML service 314 can provide reasonably good results. In other embodiments, the application optimization engine 308, ML service 314, and/or data collection engine 318 may be started and stopped manually, such as in response to user input. In yet another embodiment, if the system is configured as a cloud service, the application optimization engine 308, ML service 314, and/or data collection engine 318 may be started by receiving a request message from IHS 104 to the application optimization engine 308, ML service 314, and/or data collection engine 318, and sending a response message to IHS 104 for initiating a communication channel between IHS 104 and application optimization engine 308, ML service 314, and/or data collection engine 318 for enabling control over the resources of IHS 104.

At step 702, the IHS 104 is started and target applications are used in a normal manner. At step 704, the method 700 collects data about how the user is operating the IHS 104 to identify a persona of the user. For example, the method 700 may access a Global Positioning System (GPS) receiver configured on the IHS 104, or an IP address of the NIC card of the IHS 104 to determine a location (e.g., work, home, travel, etc.) of the user. As another example, the method 700 may log the time of day to provide further resolution about a current persona of the user. Thereafter at step 706, the method 700 uses the collected user data to derive a persona of the user. In one embodiment, the method 700 may access the trained supervised personal model generated at step 512 of method 500 to derive the persona of the user.

At step 708, the method 700 identifies the applications that are currently being used by the user. The method 700 then identifies a category of each application at step 710. In one embodiment, the method 700 may access the results of the application categorization obtained at step 410 of method 400 to identify a category for each of the applications currently being used. At step 712, the method 700 may then identify certain productivity applications from all of the applications currently being used. In one embodiment, the method 700 may access the list of productivity application using the list of productivity applications for the identified persona generated at step 614 of method 600. Now that the method 700 has identified the productivity applications based upon the user's current persona, it can optimize the productivity applications (e.g., target applications) for the user at step 714.

Thus as shown and described above, the application performance enhancement system can continually monitor the IHS 104 to derive ML-based features about how the user is operating the IHS 104, and select certain productivity applications based upon the user's current persona. Nevertheless, as time goes by, the application performance enhancement system can be responsive to changes in the user's persona by continually monitoring the behavior patterns of the user over time and updating the user's persona information so that other productivity applications may be effectively and efficiently optimized.

The methods 400, 500, 600, and 700 may be continually performed for optimization of productivity application as the user's persona changes. Nevertheless, when the use of methods 400, 500, 600, and 700 is no longer needed or desired, the methods 400, 500, 600, and 700 end.

Although FIGS. 4, 5, 6, and 7 describe example methods 400, 500, 600, and 700 that may be performed to optimize productivity applications based upon a user's current persona and application category, the features of the methods 400, 500, 600, and 700 may be embodied in other specific forms without deviating from the spirit and scope of the present disclosure. For example, the methods 400, 500, 600, and 700 may perform additional, fewer, or different operations than those described in the present examples. For another example, the methods 400, 500, 600, and 700 may be performed in a sequence of steps different from that described above. As yet another example, certain steps of the methods 400, 500, 600, and 700 may be performed by other components in the IHS 104 other than those described above. For example, certain steps of the aforedescribed methods 400, 500, 600, and 700 may be performed by a cloud-based service.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterward be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) orchestration system, comprising:

at least one processor; and at least one memory coupled to the at least one processor, the at least one memory having program instructions stored thereon that, upon execution by the at least one processor, cause the IHS to:

perform an unsupervised Machine Learning (ML) process to derive a plurality of persona models that are different from one another;

train a supervised ML model using the derived persona models;

gather data about how the user is using the one or more applications;

compare, using the supervised ML process, the gathered data against the persona models to identify a current persona of a user of the IHS, the current persona comprising one of a plurality of modes of operating the IHS by the user, the current persona identified by gathering a plurality of attributes of the application as it is being used on the IHS using a plurality of Application Program Interface (API) calls made to one or more APIs by the application to gather the attributes;

identify an application that is using the current persona; and optimize, using Machine Learning (ML), one or more resources of the IHS used to execute the identified application.

2. The IHS of claim 1, wherein the type of application comprises at least one of a database type, a multimedia type, an enterprise type, an educational type, and a simulation type.

3. The IHS of claim 1, wherein the program instructions, upon execution, further cause the IHS to:

optimize the application for bandwidth usage over at least one of a plurality of active network connections of the IHS.

4. The IHS of claim 3, wherein the program instructions, upon execution, further cause the IHS to:

select one of the active network connections for use by the application to optimize the application.

5. An application performance enhancement method comprising:

performing an unsupervised Machine Learning (ML) process to derive a plurality of persona models that are different from one another;

training a supervised ML model using the derived persona models;

gathering data about how the user is using the one or more applications;

comparing, using the supervised ML process, the gathered data against the persona models to identify a current persona of a user of the IHS, the current persona comprising one of a plurality of modes of operating the IHS by the user, the current persona identified by gathering a plurality of attributes of the application as it is being used on the IHS using a plurality of Application Program Interface (API) calls made to one or more APIs by the application to gather the attributes;

identifying an application that is using the current persona; and optimizing, using Machine Learning (ML), one or more resources of the IHS used to execute the identified application.

6. The application performance enhancement method of claim 5, wherein the type of application comprises at least one of a database type, a multimedia type, an enterprise type, an educational type, and a simulation type.

7. The application performance enhancement method of claim 5, further comprising:

optimizing the application for bandwidth usage over at least one of a plurality of active network connections of the IHS.

8. The application performance enhancement method of claim 7, further comprising:

selecting one of the active network connections for use by the application to optimize the application.

9. A non-transitory memory storage device having program instructions stored thereon that, upon execution by one or more processors of an Information Handling System (IHS), cause the IHS to:

perform an unsupervised Machine Learning (ML) process to derive a plurality of persona models that are different from one another;

train a supervised ML model using the derived persona models;

gather data about how the user is using the one or more applications;

compare, using the supervised ML process, the gathered data against the persona models to identify a current persona of a user of the IHS, the current persona comprising one of a plurality of modes of operating the IHS by the user, the current persona identified by gathering a plurality of attributes of the application as it is being used on the IHS using a plurality of Application Program Interface (API) calls made to one or more APIs by the application to gather the attributes;

identify an application that is using the current persona; and optimize, using Machine Learning (ML), one or more resources of the IHS used to execute the identified application.

10. The non-transitory memory storage device of claim 9, wherein the program instructions, upon execution, further cause the IHS to:

optimize the application for bandwidth usage over at least one of a plurality of active network connections of the IHS.

* * * * *